March 26, 1940.  H. J. SAUER  2,195,189
AUTOMOBILE LAMP SOCKET
Filed June 19, 1937
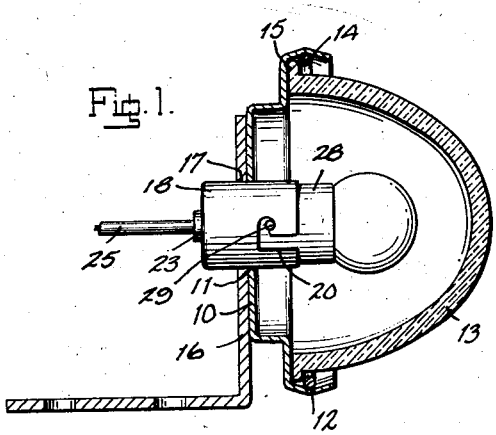
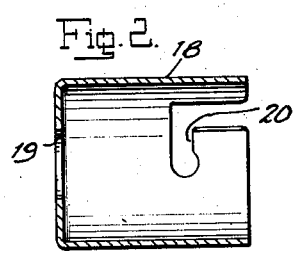 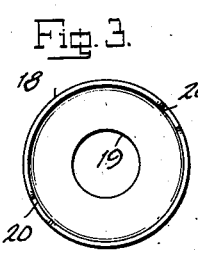 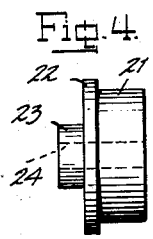 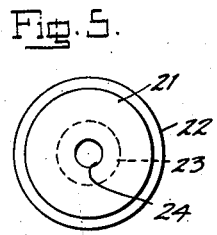
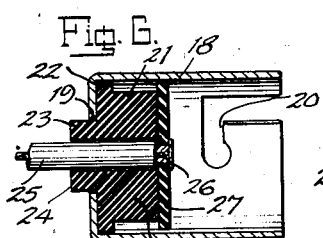 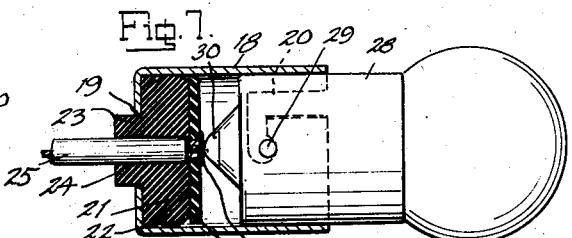
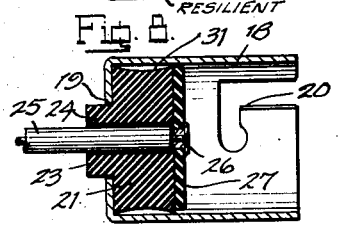 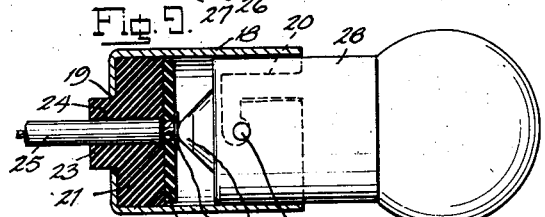
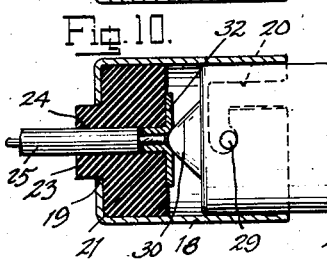
INVENTOR
HENRY J. SAUER
BY
ATTORNEY Patented Mar. 26, 1940

2,195,189

UNITED STATES PATENT OFFICE 2,195,189

AUTOMOBILE LAMP SOCKET

Henry J. Sauer, Fairfield, Conn., assignor to The Kilborn-Sauer Company, Fairfield, Conn., a corporation of Connecticut Application June 19, 1937, Serial No. 149,113

1 Claim. (Cl. 173—328)

The present invention relates to an automobile lamp socket, particularly of the type adapted for use in tail lamps, signal lamps, head lamps and the like. Heretofore these sockets have consisted of a shell in which a helical spring was disposed for resiliently supporting the contact end of the wire, and which spring when compressed by engagement of the lamp bulb retained the lamp bulb base in locking engagement with bayonet slots provided in the shell. These sockets have been objectionable as they did not seal the shell against the entrance of dust and moisture, so that the spring would rust and deteriorate and short circuits were likely to occur. Also the wire was not protected against scraping contact with the edge of the opening in the shell through which it extended, with the result that the insulation was apt to become scraped and cut.

An object of the present invention is to provide a socket in which a rubber insert member provides spring support for the contact end of the wire and at the same time seals the interior of the shell against entrance of dirt and moisture, the sealing being effected through compression of the rubber, so that the sealed relation is maintained at all times while the socket is in use.

A further object is to provide as a part of such rubber insert a protective ferrule engaged in the hole in the shell so that the wire is resiliently supported out of contact with the shell and is effectively insulated from the shell, the wire passage of the insert member tightly closing and sealing about the wire upon compression of the insert member.

With the above and other objects in view embodiments of the invention are shown in the accompanying drawing, and these embodiments will be hereinafter more fully described with reference thereto, and the invention will be finally pointed out in the claim.

In the drawing:

Fig. 1 is a vertical sectional view of a vehicle lamp showing the socket according to the present invention provided therein.

Fig. 2 is a longitudinal sectional view of the shell.

Fig. 3 is an end view thereof.

Fig. 4 is a side elevation of the rubber insert member.

Fig. 5 is an end view thereof.

Fig. 6 is a sectional view showing the insert assembled in the socket and in its uncompressed state before connection of the lamp bulb.

Fig. 7 is a similar view showing the lamp bulb in place and the insert compressed.

Fig. 8 is a sectional view of a modified form of the invention and showing the insert in its uncompressed state before connection of the lamp bulb.

Fig. 9 is a view showing the lamp bulb in place and the insert compressed.

Fig. 10 is a sectional view of a further modified form of socket and showing the lamp bulb in place.

Similar reference characters indicate corresponding parts throughout the several figures of the drawing.

Referring to the drawing, the vehicle lamp comprises a back or casing member 10 having a central aperture 11 and a forwardly bent slightly convergent rim 12 adapted to receive the lens 13, which latter is removably secured by a split spring ring 14 engaged over the edge flange 15 of the lens and held in place by the slight convergence of the rim 12. An attaching bracket 16 is secured to the rear surface of the casing 10 by riveting, spot welding, or the like, and is provided with an aperture 17 registering with the aperture 11 of the casing.

The lamp socket shell 18, of cylindrical cup-shape, is secured in the apertures 11 and 17 in the usual manner by welding or soldering, and is provided in its outer flanged end with a central aperture 19 and in its side wall adjacent the inner end with a pair of bayonet slots 20—20. The rubber insert member 21 is provided at its base end with a flange 22 adapted to seat against the flanged end of the shell and has a cylindrical ferrule projection 23 at its outer end adapted to engage and project through the aperture 19 of the shell. A central passage 24 is provided in the insert through which the insulation covered wire 25 is engaged, this wire having its end secured by soldering to an annular eyelet contact member 26, provided centrally of a compression disc 27 formed of fibre or other suitable insulation material, and which engages the inner end of the insert member.

The lamp base 28 is provided with oppositely disposed pins 29 which engage the bayonet slots and with a center contact 30 which engages the button end 26 of the wire, the rubber insert member being compressed through engagement of the lamp base, and the lamp base being yieldably retained through outward pressure in interlocking engagement with the bayonet slots. Upon compression of the rubber it is expanded at its sides, as shown in Fig. 7, and the flange end 22 is tightly pressed against the base of the shell, thus tightly sealing the interior of the shell against the entrance of dust or moisture, and effectually maintaining this seal as long as the bulb is in place. The ferrule projection 23 is retained in the aperture 19 through the compression of the insert, and protects the wire against contact with the edge of the aperture 19. The projection of the ferrule projection 23 outwardly beyond the aperture 19 provides a flexible support for the wire to support it against too sharp bending into rubbing engagement with the shell. The passage 24 contracts and seals about the wire 25.

In Figs. 8 and 9 I have shown a modification of the invention in which the outer side wall of the insert is slightly concave, as at 31, so that when it is compressed, as shown in Fig. 9, by engagement of the lamp bulb base the outer wall expands into tight engagement with the inner wall of the shell.

In Fig. 10 I have shown a modification in which the insulating disc 27 is dispensed with, the wire having a tubular flanged rivet-like member 32 secured upon its end by welding or soldering, and which provides a centrally dished contact end for engagement of the center contact of the lamp base having a compression member for compressing the rubber insert member. The member 32 is of sufficient diameter to engage a relatively large area of the inner end of the insert member, so that the latter will be effectually compressed upon engagement of the lamp base with the shell, but at the same time is sufficiently spaced from the side wall of the shell to prevent any possibility of contact therewith.

I have illustrated and described preferred and satisfactory embodiments of the invention, but it will be obvious that changes may be made therein, within the spirit and scope thereof, as defined in the appended claim.

Having thus described my invention what I claim and desire to secure by Letters Patent is:

In a lamp socket, a cup-shaped shell comprising a cylindrical side wall having means for interlocking engagement of a lamp bulb and a planular base flange extending inwardly from one end of said wall and having a central opening, the wall of said opening extending axially inwardly from the outer surface of said flange and terminating at the inner surface of said flange, a resilient insert of rubber engaged in said shell in contacting relation at one end with the inner surface of said base flange and having at said end a central integral extension engaged in said opening and projecting outwardly therefrom beyond the outer surface of said base flange, the projecting portion of said extension being unconfined at its side and end surfaces whereby it is free to flex relatively to said base flange, said insert having a central wire receiving passage extending through said extension to the inner end of said insert, a flexible wire engaged through said passage, a compression member secured to the end of said wire of greater diameter than the diameter of said central opening of said shell and engaging the inner end of said insert in axially opposed parallel relation to the base flange of said shell, said compression member adapted to be pressed by the lamp bulb engaged in said socket toward said base flange to compress said insert, whereby the annular outer portion of said insert is axially compressed while said central integral extension remains non-compressed.

HENRY J. SAUER.